US006619685B2

(12) United States Patent
Teague

(10) Patent No.: US 6,619,685 B2
(45) Date of Patent: Sep. 16, 2003

(54) UNIVERSAL TRAILER HITCH MIRROR SYSTEM

(76) Inventor: Gary Q. Teague, 2306 Queen palm Ct., Leesburg, FL (US) 34748

( * ) Notice: Subject to any disclaimer, the term of this patent is extended or adjusted under 35 U.S.C. 154(b) by 0 days.

(21) Appl. No.: 09/923,823

(22) Filed: Aug. 7, 2001

(65) Prior Publication Data

US 2003/0030247 A1 Feb. 13, 2003

(51) Int. Cl.[7] .................................................. B60R 1/08
(52) U.S. Cl. .................................... 280/477; 359/872
(58) Field of Search ........................... 280/477; 359/344, 359/872, 873, 874, 876, 877

(56) References Cited

U.S. PATENT DOCUMENTS

| | | | |
|---|---|---|---|
| 4,905,376 A | | 3/1990 | Neeley |
| 4,925,287 A | | 5/1990 | Lord et al. |
| 5,111,342 A | * | 5/1992 | Quesada ..................... 359/872 |
| 5,180,182 A | | 1/1993 | Haworth |
| 5,313,337 A | | 5/1994 | Byers |
| 5,482,310 A | * | 1/1996 | Staggs ......................... 280/477 |
| 5,625,500 A | | 4/1997 | Ackerman |
| 5,657,175 A | | 8/1997 | Brewington |
| 5,784,213 A | | 7/1998 | Howard |
| 5,825,564 A | * | 10/1998 | Mazarac ..................... 359/872 |
| 5,971,555 A | | 10/1999 | Wilcox et al. |
| 6,102,423 A | | 8/2000 | Beck et al. |

\* cited by examiner

Primary Examiner—Kevin Hurley
(74) Attorney, Agent, or Firm—Edward M. Livingston, Esq

(57) ABSTRACT

A universal trailer-hitch mirror system has an attachment configuration (1, 20) with a system fastener that includes a suction cup (2), a tailgate hook (3) and a base (4) for fastening the attachment configuration universally to a support object that is accessible for support of a system mirror (7) for mirror viewing of tow components (18) of a tow vehicle and trailer components (19) of a trailerable vehicle with the tow vehicle being within hitching-steerable proximity to the trailerable vehicle. The system mirror can be positioned for viewing from either a rearview mirror (14) or a side-view mirror (22). A mirror holder (5, 21) is attached orientationally to the attachment configuration with an orientation controller (6). The system mirror is attached orientationally to the mirror holder with a system-mirror joint (8). The attachment configuration is articulated to be positioned in desired proximity to rear components of the tow vehicle, to front components of the trailerable vehicle and to objects which include ground surface (23) proximate thereto selectively. The system fastener is articulated predeterminedly to attach the attachment configuration to the support object selectively.

1 Claim, 5 Drawing Sheets

FIG. 1
FIG. 2
FIG. 3
FIG. 4
FIG. 5
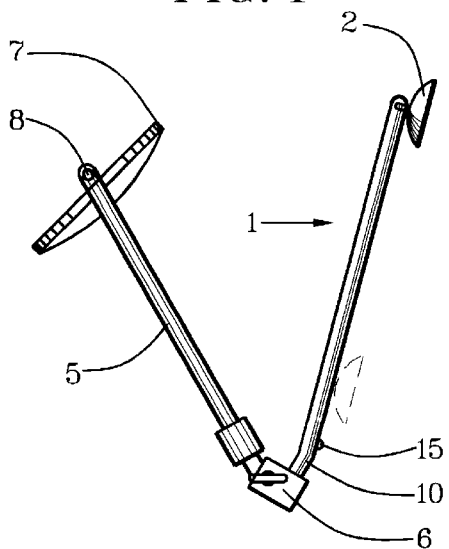
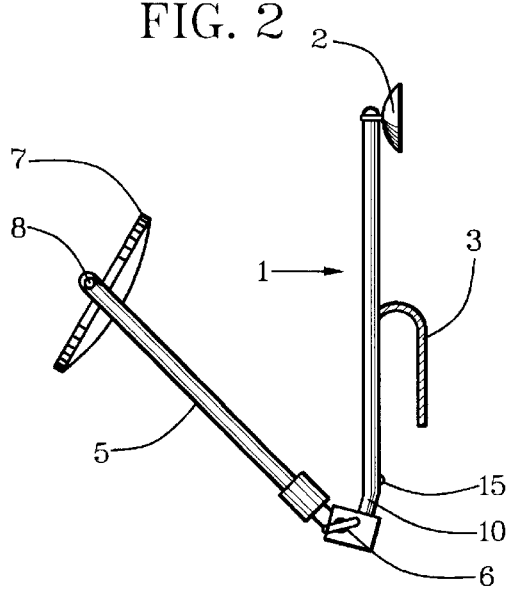
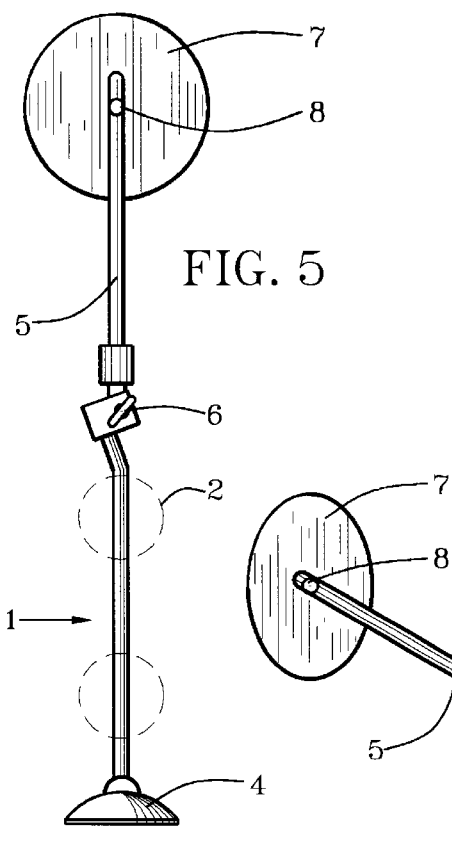
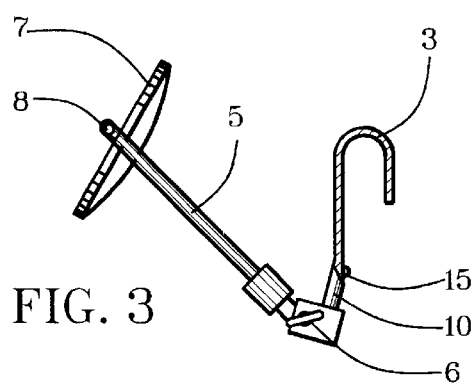
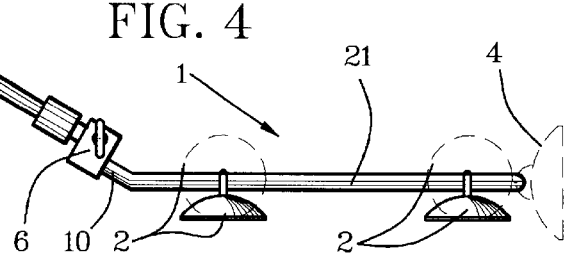

UNIVERSAL TRAILER HITCH MIRROR SYSTEM

BACKGROUND OF THE INVENTION this invention relates to mirrors for viewing trailer hitches on backs of tow vechicles while being backed into hookup position for hitching trailer vehicles to the tow vehicles.

Known trailer-hitch mirrors and mirrors systems provide variously for mirror vision of trailer hitches for backing up tow vehicles to a hookup position in order to hitch trailer vehicles to the tow vehicles. None are known, however, to have an adjustable-angle mirror on a mirror holder having orientational attachment to an attachment configuration that can be situated universally on support objects for mirror-view positioning of a system mirror from either a rearview or a side-view vehicle mirror in a manner taught by this invention.

Examples of most-closely related known but different trailer-hitch mirrors are described in the following patent documents:

| U.S. Pat. No. | Inventor | Issue Date |
| --- | --- | --- |
| 6,102,423 | Beck, et al. | Aug. 15, 2000 |
| 5,971,555 | Wilcox, et al. | Oct. 26, 1999 |
| 5,313,337 | Byers | May 17, 1994 |
| 5,625,500 | Ackerman | Apr. 29, 1997 |
| 4,925,287 | Lord, et al. | May 15, 1990 |
| 5,784,213 | Howard | Jul. 21, 1998 |
| 4,905,376 | Neely | Mar. 06, 1990 |
| 5,180,182 | Haworth | Jan. 19, 1993 |
| 5,657,175 | Brewington | Aug. 12, 1997 |

SUMMARY OF THE INVENTION

Objects of patentable novelty and utility taught by this invention are to provide a universal trailer-hitch mirror system which:

- provides trailer-hitching view from an inside rearview mirror of cars and trucks having rear-window vision;
- provides trailer-hitching view through side-view mirrors of vehicles not having rear-window vision;
- is quick and easy to position wherever most convenient, accessible and effective for mirror viewing of trailer-hitch components of tow vehicles and trailerable vehicles that are within hitching-steerable proximity;
- can be stored conveniently; and
- can be inexpensive and long lasting.

This invention accomplishes these and other objectives with a universal trailer-hitch mirror system with an attachment configuration having a system fastener for fastening the attachment configuration to a support object that is accessible for support of a system mirror for mirror viewing of tow trailer-hitch components of a tow vehicle and trailerable trailer-hitch components of a trailerable vehicle with the tow vehicle being within hitching-steerable proximity to the trailerable vehicle. A mirror holder is attached orientationally to the attachment configuration with an orientation controller. The system mirror is attached orientationally to the mirror holder with a system-mirror joint. The attachment configuration is articulated to be positioned in desired proximity to rear components of the tow vehicle and to objects proximate thereto selectively. The system fastener is articulated predeterminedly to attach the attachment configuration to the support object selectively. The orientation controller is articulated to orient the mirror holder controllably in a desired orientation of attachment to the attachment configuration. The system-mirror joint is articulated to orient the system mirror in a mirrored line of sight from a vehicle mirror to the tow trailer-hitch components and to the trailerable trailer-hitch components selectively.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

FIG. 1 is a side view showing an attachment configuration that can be one or more rods;

FIG. 2 is the FIG. 1 illustration with addition of a tailgate hook to the attachment configuration;

FIG. 3 is the FIG. 2 illustration with the tailgate hook being the attachment configuration;

FIG. 4 is a side view showing the attachment configuration as a rod along which a plurality of suction cups are positioned with circumferential and linear adjustment of positioning fixedly on the rod;

FIG. 5 is a side view of the FIG. 4 illustration in vertical orientation as a stand on a base that can include a suction cup;

DESCRIPTION OF PREFERRED EMBODIMENT

Figure 6:
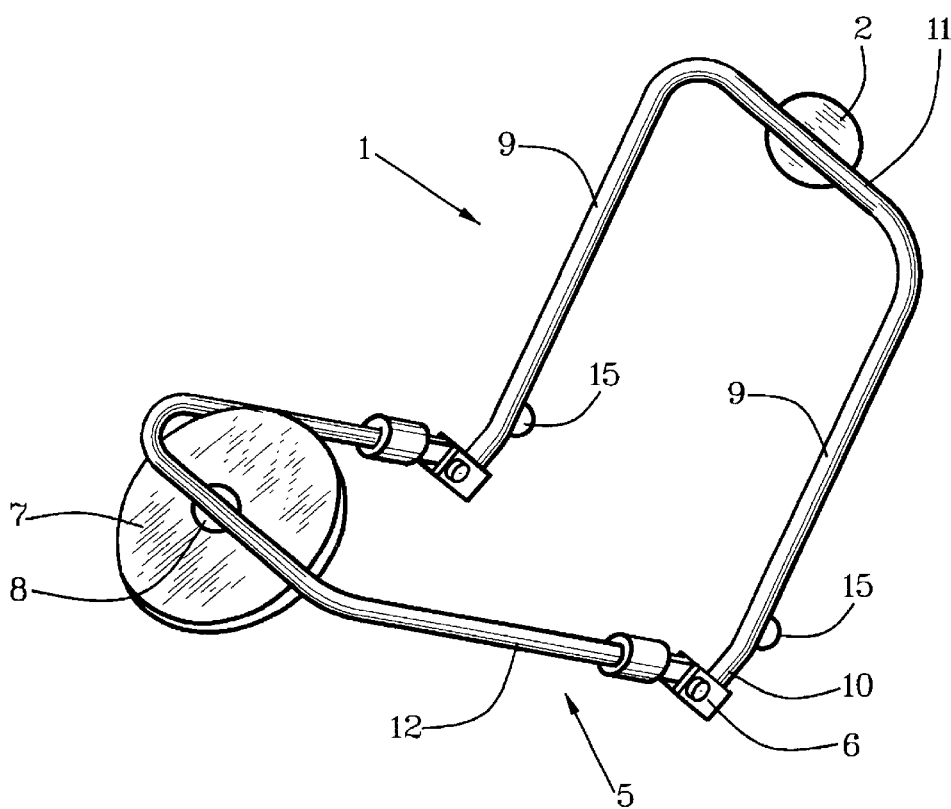
FIG. 6 is a perspective view of the FIG. 1 illustration having two bracket attachment rods.

Listed numerically below with reference to the drawings are terms used to describe features of this invention. These terms and numbers assigned to them designate the same features throughout this description.

1. Attachment configuration
2. Suction cup
3. Tailgate hook
4. Base
5. Mirror holder
6. Orientation controller
7. System mirror
8. System-mirror joint
9. Bracket attachment rods
10. Controller ends
11. Window-bracket member
12. Mirror attachment rods
13. Back window
14. Rearview mirror
15. Rubber bumper
16. Trunk top
17. Line of sight
18. Tow components
19. Trailer components
20. Attachment rod
21. Holder rod
22. Side-view mirror
23. Ground surface
24. Telescopic sections Referring to FIGS. 1–5, a universal trailer-hitch mirror system has an attachment configuration 1 with a system fastener that can include one or more suction cups 2, a tailgate hook 3 and a base 4. A mirror holder 5 is attached orientationally to the attachment configuration 1 with an orientation controller 6. A system mirror 7 is attached orientationally to the mirror holder 5 selectively with a system-mirror joint 8.

Figure 7:
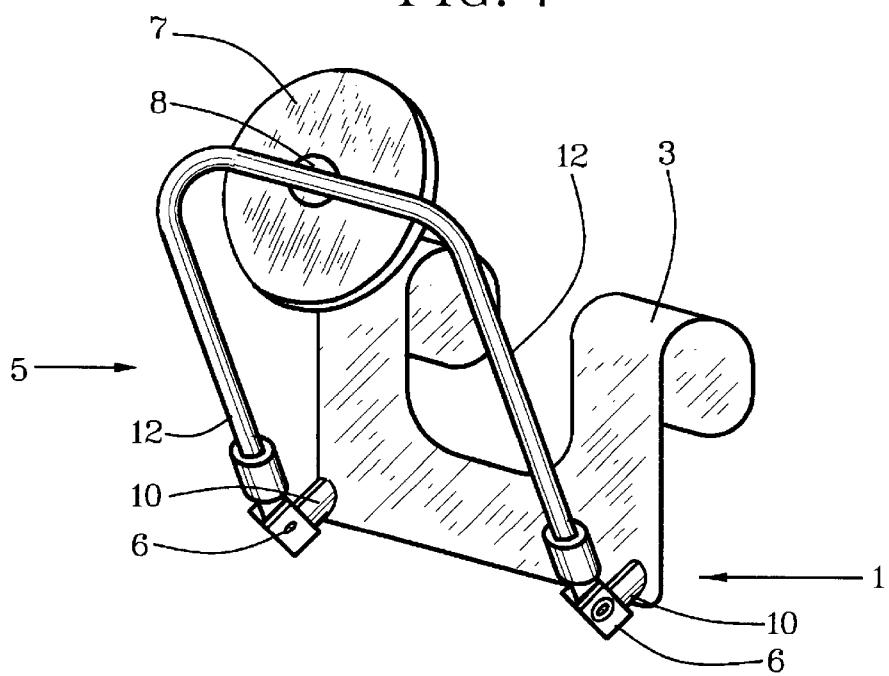
FIG. 7 is a perspective view of the FIG. 3 illustration.
Figure 8:
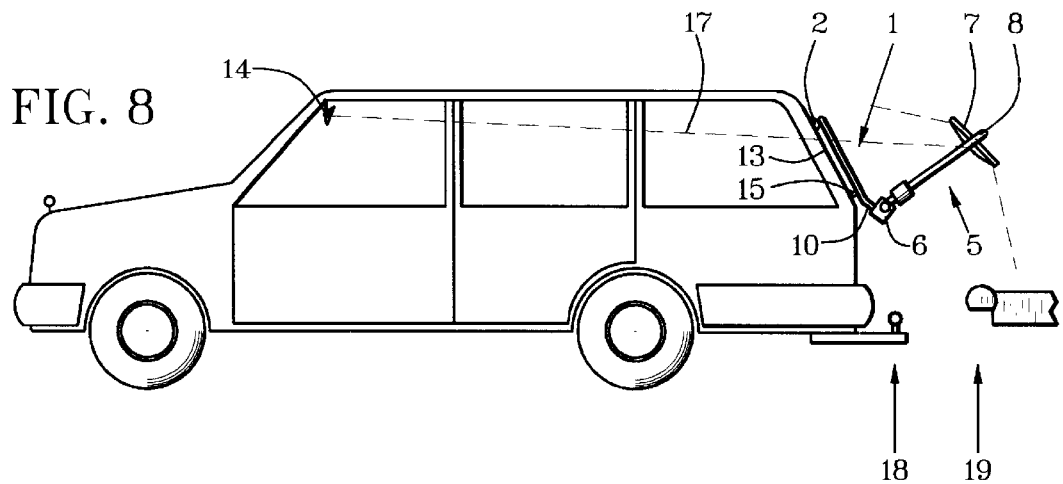
FIG. 8 is a side view of a station wagon or sport utility vehicle on a rear window of which the FIG. 6 illustration is positioned for mirror view through the vehicle from a rearview mirror.
Figure 9:
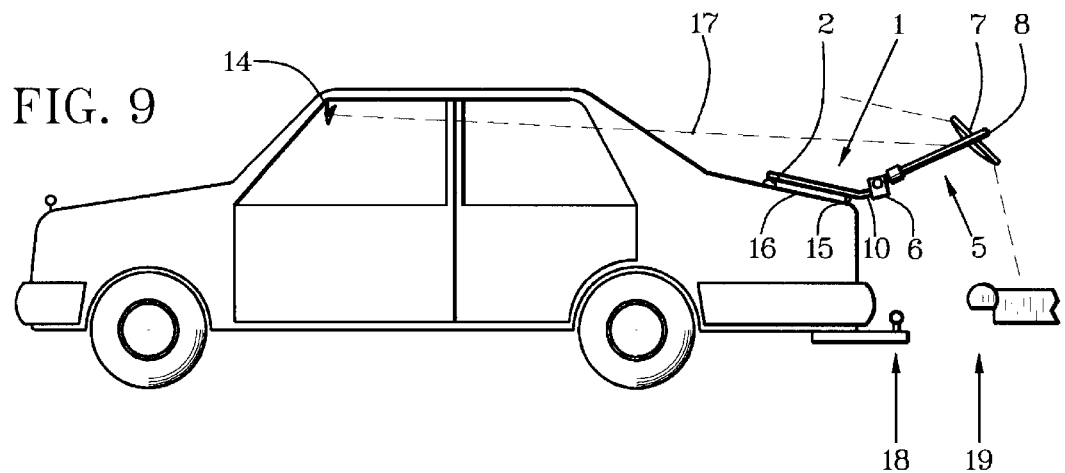
FIG. 9 is a side view of a sedan motor vehicle on a rear trunk of which the FIG. 6 illustration is positioned for mirror view through the vehicle from the rearview mirror.
Figure 10:
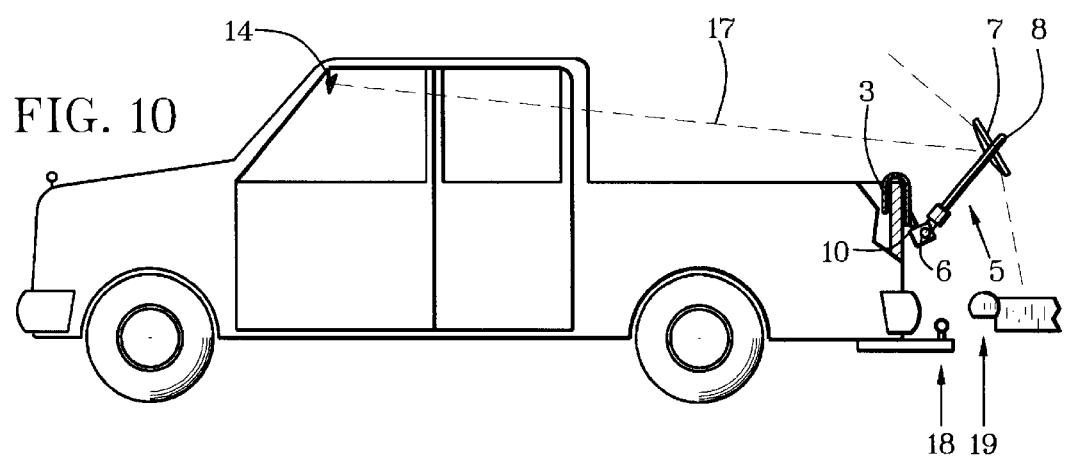
FIG. 10 is a side view of a pickup truck on a rear tailgate of which the FIG. 7 illustration is positioned for mirror view through the vehicle from the rearview mirror.

Referring to FIGS. 1–7, the attachment configuration 1 can include a window bracket having two bracket attachment rods 9 with controller ends 10 extended in a direction that is outwardly from a rear surface of a vehicle as shown in FIGS. 8–10. For a window-bracket embodiment, the suction cup 2 is on a window-bracket member 11 intermediate the two bracket attachment rods 9.

In the FIG. 8 embodiment, the tailgate hook 3 is attached to the controller ends 10 with the tailgate hook 3 being a large portion of the attachment configuration 1.

In the embodiments shown in FIGS. 7–8, the orientation controller 6 includes two pivot joints with which two mirror attachment rods 12 of the mirror holder 5 are attached orientationally and fixedly to the two bracket attachment rods 9.

Referring to FIGS. 1–10, a support object to which the system fastener is attachable includes a back window 13 of a tow vehicle in a vehicle class that includes a station wagon, a sports utility vehicle or other motor vehicle for which the back window 13 is situated near a back and through which there is rear vision from a vehicle mirror that is a rearview mirror 14 through the motor vehicle as shown in FIG. 8. The attachment configuration 1 for such class of vehicles includes the suction cup 2 that is placed at the top of the back window 13. A rubber bumper 15 proximate the controller ends 10 raises the attachment configuration 1 off of the motor vehicle to prevent scratching or marring.

Similarly as shown in FIG. 9, the support object includes a trunk top 16 of a tow vehicle in a vehicle class that includes a sedan and a coupe.

For a pickup truck with rear view from the rearview mirror 14 as shown in FIG. 10, the system fastener can include the tailgate hook 3.

For the embodiments shown and described in relation to FIGS. 1, 3 and 8–10, there is a line of sight 17 from the rearview mirror 14 to the system mirror 7 for mirror-view vision of tow components 18 on a tow vehicle and for vision of trailer components 19 on a trailerable vehicle with the tow vehicle being within hitching-steerable proximity to the trailerable vehicle. Optional U-shapes of the attachment configuration 1 and the mirror holder 5 can be provided for facilitating the line of sight 17 through them for these embodiments.

Figure 16:
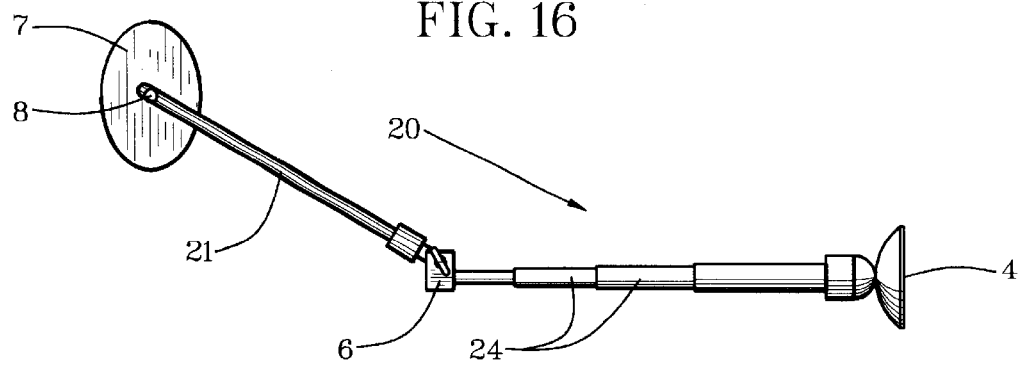
FIG. 16 is a side view of the attachment configuration that is the attachment rod that is telescoped for length variation and has a stand that can be a suction cup that can be positioned on either a side or the end of the attachment rod.

Referring to FIGS. 1–1.67, the attachment configuration 1 can include an attachment rod 20 along which one or more predetermined system fasteners are fixedly positioned selectively and the mirror holder 5 can include a holder rod 21 as an option to the two bracket attachment rods 9 and the mirror attachment rods 12 described in relation to FIGS. 6–7. Positioning of the system fasteners selectively along the attachment rod 20 includes affixing the suction cups 2 and other system fasteners circumferentially and linearly on the attachment rod 20 as depicted in FIGS. 4 and 16. This allows the attachment rod 20 to be situated circumferentially and oriented linearly in proximity to whatever support object is beside, under or otherwise proximate the tow components 18 and the trailer components 19. Hence, a relatively universal aspect of this invention of a universal trailer-hitch mirror system.

Figure 11:
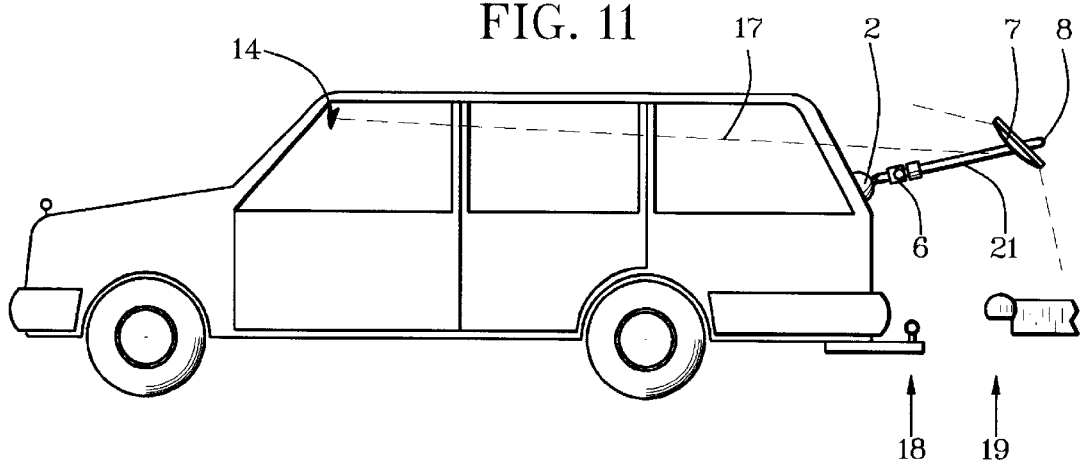
FIG. 11 is a side view of the station wagon or sport utility vehicle on the rear window of which the attachment configuration that is an attachment rod is positioned with a system mirror in a center portion of the rear window for mirror view through the vehicle from a rearview mirror.
Figure 12:
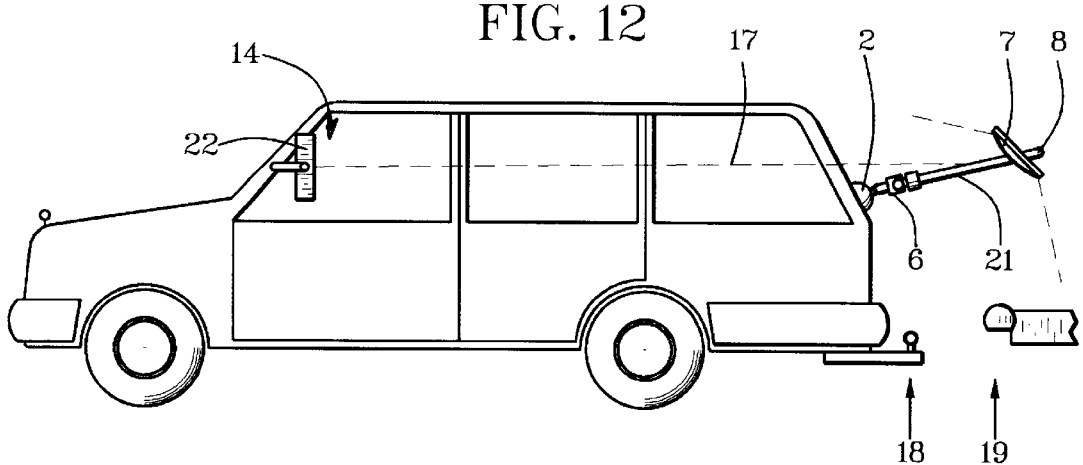
FIG. 12 is a side view of the station wagon or sport utility vehicle on the rear window of which the attachment configuration that is an attachment rod is positioned with a system mirror beside the rear window for mirror view through the vehicle from a side-view mirror.
Figure 13:
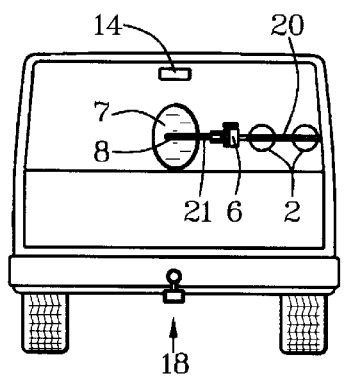
FIG. 13 is a rear view of the FIG. 11 illustration.
Figure 14:
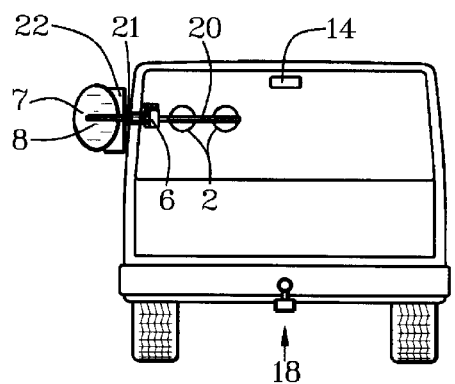
FIG. 14 is a rear view of the FIG. 12 illustration.

As shown in FIGS. 11–14, the attachment rod 20 can be situated selectively on a back surface that includes the back window 13 and can include the trunk top 16 of a car that is used as a tow vehicle. In FIGS. 11 and 13, the attachment rod 20 is situated to position the system mirror 7 centrally to allow the line of sight 17 to be taken from the rearview mirror 14 to the system mirror 7 for use when there is vision through the tow vehicle. In FIGS. 12 and 14, the attachment rod 20 is situated to position the system mirror 7 eccentrically at a side of the tow vehicle to allow the line of sight 17 to be taken from a side-view mirror 22 to the system mirror 7 for use when there is not vision through the tow vehicle.

Figure 15:
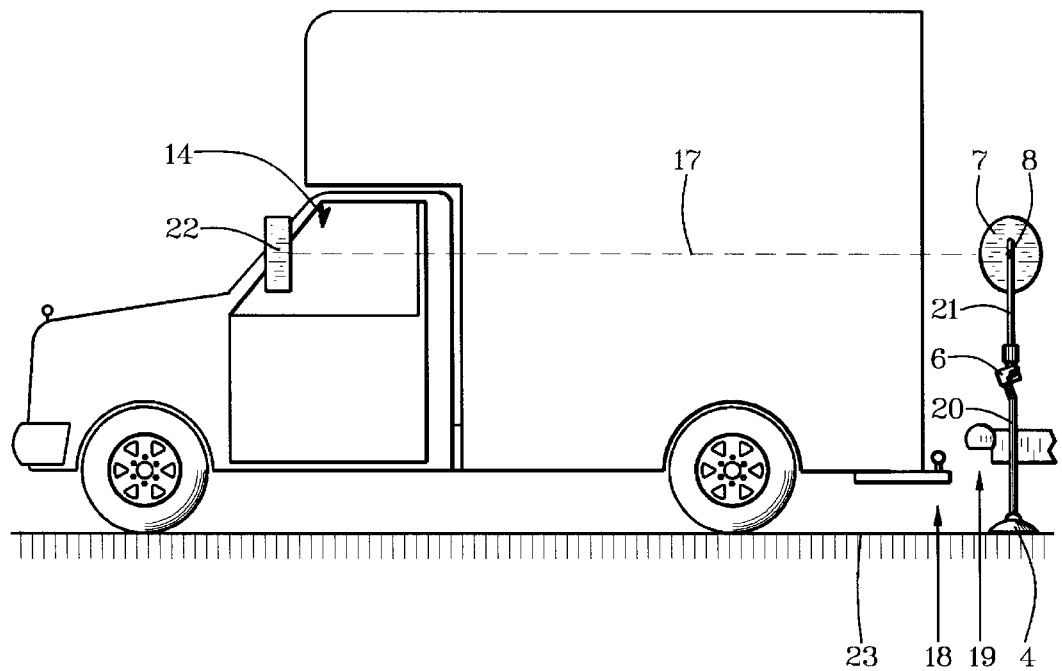
FIG. 15 is a side view of a truck beside which the attachment configuration that is the attachment rod on a stand is positioned on a ground surface with the system mirror beside a rear of the truck for mirror view through the vehicle from a side-view mirror.

As shown in FIG. 15, some tow vehicles, including trucks with cargo beds, without through vision from a rearview mirror 14 may not have a sufficiently smooth rear surface for suction attachment, but generally do have the side-view mirror 22. For such situations, the attachment rod 20 can have the base 4 that is described in relation to FIG. 5 and described further in relation to FIG. 16. The base 4 can be positioned on ground surface 23, whether rubberlike for suction use also or rigid.

Optionally, the attachment rod 20 can be telescopic with telescopic sections 24, as shown further in FIG. 16, for adjustable height or distance positioning of the system mirror 7. Also optionally, the base 4 and other system fasteners can be magnetic for positioning the attachment rod 20 on metallic surfaces that can include framework of the tow components 18 and the trailer components 19 in order to position the system mirror 7 for the line of sight 17 through the tow vehicle from the rearview mirror 14.

A new and useful universal trailer-hitch mirror system having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A universal trailer-hitch mirror system comprising:

an attachment configuration having a system fastener for fastening the attachment configuration to a support object that is accessible for support of a mirror holder on which a system mirror is positioned for mirror-viewing of tow trailer-hitch components of a tow vehicle and for mirror-viewing of trailerable trailer-hitch components of a trailerable vehicle from a vehicle mirror;

the tow vehicle being within hitching-steerable proximity to the trailerable vehicle;

the mirror holder being attached orientationally to the attachment configuration with an orientation controller;

the system mirror being attached orientationally to the mirror holder selectively with a system-mirror joint;

the attachment configuration being articulated to be positioned in desired proximity to rear components of the tow vehicle, to front components of the trailerable vehicle and to objects proximate thereto selectively;

the system fastener being articulated predeterminedly to attach the attachment configuration to the support object selectively;

the orientation controller being articulated to orient the mirror holder controllably in a desired orientation of attachment to the attachment configuration; and the system-mirror joint being articulated to orient the system mirror in a mirrored line of sight from the vehicle mirror to the tow trailer-hitch components and to the trailerable trailer-hitch components selectively, wherein the support object is a back window of the tow vehicle;

the attachment configuration includes a window bracket having two bracket attachment rods with controller ends extended in a direction that is outwardly from a rear surface of the tow vehicle;

the orientation controller includes two pivot joints with which the mirror holder is attached orientationally and fixedly to the two bracket attachment rods;

the system fastener includes a suction cup on a window-bracket member intermediate the two bracket attachment rods;

the suction cup is articulated and situated to suction-fasten the window bracket to the back window of the tow-vehicle;

bracket cushioning is situated intermediate the window bracket and the rear surface of the tow vehicle;

the mirror holder includes a mirror bracket having two mirror attachment rods that are attached to the two bracket attachment rods with the two pivot joints;

the system-mirror joint is on a window-bracket member intermediate the two mirror attachment rods; and the vehicle mirror is a rearview mirror having line-of-sight vision through the tow vehicle to the system mirror.

* * * * *